United States Patent
Weatherill et al.

(10) Patent No.: US 11,813,565 B1
(45) Date of Patent: Nov. 14, 2023

(54) MATERIALS HAVING IMPROVED WETTABILITY AND RELATED METHODS OF USE AND MANUFACTURE

(71) Applicant: KLÖCKNER PENTAPLAST OF AMERICA, INC., Gordonsville, VA (US)

(72) Inventors: Timothy D. Weatherill, Charlottesville, VA (US); Gerald J. Fiorillo, Mineral, VA (US); Sarah C. Rogers, Charlottesville, VA (US); Jeffrey W. Smith, Elkton, VA (US); Carlos Daniel Stagnaro, Charlottesville, VA (US); Devesh Mathur, Marietta, GA (US); Ryan Joseph Carter, Gordonsville, VA (US)

(73) Assignee: KLÖCKNER PENTAPLAST OF AMERICA, INC., Gordonsville, VA (US)

( * ) Notice: Subject to any disclaimer, the term of this patent is extended or adjusted under 35 U.S.C. 154(b) by 0 days.

(21) Appl. No.: 18/307,143

(22) Filed: Apr. 26, 2023

Related U.S. Application Data

(60) Provisional application No. 63/336,540, filed on Apr. 29, 2022.

(51) Int. Cl.
*B01D 53/18* (2006.01)
*B01D 53/14* (2006.01)
(Continued)

(52) U.S. Cl.
CPC ......... *B01D 53/18* (2013.01); *B01D 53/1475* (2013.01); *B01D 53/1493* (2013.01);
(Continued)

(58) Field of Classification Search
CPC ............... B01D 53/18; B01D 53/1475; B01D 53/1493; B01D 53/62; B01D 53/78;
(Continued)

(56) References Cited

U.S. PATENT DOCUMENTS 8,119,091 B2 2/2012 Keith et al.
8,871,008 B2 10/2014 Henderson et al.
(Continued)

FOREIGN PATENT DOCUMENTS

CN 101940907 A 1/2011
JP 2003170041 A 6/2003
(Continued)

OTHER PUBLICATIONS

JP-2011036765-A English translation (Year: 2011).*
(Continued)

*Primary Examiner* — Anita Nassiri-Motlagh
(74) *Attorney, Agent, or Firm* — GOODWIN PROCTER LLP

(57) ABSTRACT

In general, the subject matter described herein relates to wettable materials that can be used to expose a liquid phase to a gas phase. An example method includes: providing a material including a polymeric substrate and at least one of: a silicate coating disposed over the polymeric substrate; or a polar mineral additive dispersed within the polymeric substrate at a loading from about 1% to about 25%, by
(Continued)

weight; and using the material in a chemical process in which the material is at least partially covered by a liquid phase and the liquid phase is exposed to a gas phase.

16 Claims, 5 Drawing Sheets

(51) Int. Cl.
    *B01D 53/62* (2006.01)
    *B01D 53/78* (2006.01)
    *B01J 19/32* (2006.01)
(52) U.S. Cl.
    CPC .............. *B01D 53/62* (2013.01); *B01D 53/78* (2013.01); *B01J 19/32* (2013.01); *B01D 2251/304* (2013.01); *B01D 2251/306* (2013.01); *B01D 2251/604* (2013.01); *B01D 2257/504* (2013.01); *B01D 2258/06* (2013.01); *B01J 2219/32213* (2013.01); *B01J 2219/32425* (2013.01); *B01J 2219/32483* (2013.01); *B01J 2219/32491* (2013.01)
(58) Field of Classification Search
    CPC ........ B01D 2251/304; B01D 2251/306; B01D 2251/604; B01D 2257/504; B01D 2258/06; B01J 19/32; B01J 2219/32212; B01J 2219/32425; B01J 2219/32483; B01J 2219/32491
    USPC ....................................................... 423/225
    See application file for complete search history.

(56) References Cited

U.S. PATENT DOCUMENTS

| | | | |
|---|---|---|---|
| 9,095,813 | B2 | 8/2015 | Keith et al. |
| 11,014,043 | B2 | 5/2021 | Heidel et al. |

FOREIGN PATENT DOCUMENTS

| | | | | |
|---|---|---|---|---|
| JP | 2009122048 A | | 6/2009 | |
| JP | 2011036765 A | * | 2/2011 | ........... B01D 53/261 |

OTHER PUBLICATIONS

Applied Surface Technology, "What is PYROSIL?", Applied Surface Technology [online], retrieved from the Internet URL: <https://www/pyrosil-pre-treatment/>. Retrieved on Jun. 13, 2023, 2 pages.

Applied Surface Technology, "PYROSIL®—Proven Again & AGAIN", Applied Surface Technology [online], retrieved from the Internet URL: <https://www.appliedsurfacetech.com/how-pyrosil-works/>. Retrieved on Jun. 13, 2023, 3 pages.

Nazdar Ink Technologies, "Pyrosil® Treatment for Improving Ink Adhesion", Nazdar Ink Technologies [online], published on Jun. 30, 2016, retrieved from Internet URL: <https://www.nazdar.com/en-us/News-Press-Releases/ArtMID/4163/ArticleID/213>. Retrieved on Jun. 13, 2023, 2 pages.

Universal Tower Parts, "What is Cooling Tower Fill?", Universal Tower Parts [online], published on Sep. 9, 2021, retrieved from Internet URL: <https://www.universaltowerparts.com/what-is-cooling-tower-fill/>. Retrieved on Jun. 13, 2023, 7 pages.

Alavi et al., "Preparation and characterization of PDMS/zeolite 4A/PAN mixed matrix thin film composite membrane for CO2/N2 and CO2/CH4 separations", Research on Chemical Intermediates, Amsterdam, NL, vol. 43, No. 5, Nov. 18, 2016, pp. 2959-2984.

Banihashemi et al., "CO2 separation using PDMS/ZSM-5 zeolite composite membrane", Separation and Purification Technology, Elsevier Science, Amsterdam, NL, vol. 79, No. 3, Feb. 27, 2011, pp. 293-302.

"Invitation to Pay Additional Fees and, Where Applicable, Protest Fee," International Patent Application No. PCT/US2023/019984, dated Jul. 28, 2023, 12 pages.

* cited by examiner

MATERIALS HAVING IMPROVED WETTABILITY AND RELATED METHODS OF USE AND MANUFACTURE

CROSS-REFERENCE TO RELATED APPLICATIONS

This application claims the benefit of U.S. Provisional Patent Application No. 63/336,540, filed Apr. 29, 2022, entitled "Materials Having Improved Wettability and Related Methods of Use and Manufacture," the entire contents of which are incorporated by reference herein.

BACKGROUND

Wettability refers to a tendency for a liquid to spread on and bond to a solid surface in the presence of air or other immiscible fluids. When wettability is high, the liquid tends to spread over the solid surface and forms a low contact angle. When wettability is low, the liquid tends to bead up on the solid surface and forms a high contact angle. Solid surfaces that are more wettable tend to have a higher surface energy, compared to solid surfaces that are less wettable.

Many polymeric materials can have a low surface energy and a low wettability with water. Surface modification techniques such as corona treatments or flame treatments can make polymeric materials more wettable; however, such wettability improvements tend to be temporary and can decrease over time as the materials are exposed to contaminants, harsh chemicals, or mechanical stress.

SUMMARY

In general, the subject matter of this disclosure relates to a material having improved wettability and related methods of using and manufacturing the material. The material can include, for example, (i) a polymeric substrate and (ii) a silicate coating (or other component or constituent that includes silicon) on the polymeric substrate. The coating provides improved wettability, such as a more hydrophilic surface, a lower contact angle (e.g., with water or aqueous solutions), and/or a higher surface energy. Unlike previous wettability enhancing techniques, such as corona treatments, the improved wettability provided by the coating can be permanent (e.g., lasting indefinitely). In some examples, in addition to or instead of the coating, the material can include a polar mineral additive dispersed on or within the polymeric substrate (e.g., at a loading from about 1% to about 25%, by weight). Like the coating, the polar mineral additive can improve wettability (e.g., by providing surface roughness and/or by being exposed on the surface or altering surface chemistry). The material can be used in a chemical process (e.g., a mass transfer process or a heat transfer process) in which the material is at least partially covered by a liquid phase, and the liquid phase is exposed to a gas phase. One or more chemical components (e.g., carbon dioxide) and/or heat can be transmitted between the two phases.

Advantageously, the materials and related methods described herein can provide a plastic film (or other substrate) with a permanently elevated surface energy or improved wettability, such that chemical processes taking place on the plastic film can be more efficient, over longer periods of time. For example, the improved wettability characteristics of the materials can increase the surface area available for contact between liquid and gas phases, which can improve a residence time for reactivity. By comparison, plastic films that do not have the coatings or polar mineral additives described herein generally have a low surface energy and/or exhibit poor wetting of water, aqueous solutions, or other liquids, which can cause the liquids to bead up and/or can reduce the residence time or surface area available for chemical processes or chemical reactions.

In one aspect, the subject matter of this disclosure relates to a method that includes: providing a material including a polymeric substrate and at least one of: a silicate coating disposed over the polymeric substrate; or a polar mineral additive dispersed within the polymeric substrate at a loading from about 1% to about 25%, by weight; and using the material in a chemical process in which the material is at least partially covered by a liquid phase and the liquid phase is exposed to a gas phase.

In certain examples, the polymeric substrate includes a polymeric film (e.g., a single-layer film, a multi-layer film, a woven film, or a nonwoven film). The polymeric substrate can include polyvinyl chloride, polyethylene, polypropylene, polyester, a co-polyester, polystyrene, polyamide, polyurethane, a biopolymer, a cellulose ester, or any combination thereof. The material can include the polar mineral additive, and the polar mineral additive can be or include a zeolite. The material can include the silicate coating, and the silicate coating can include silicon dioxide. The material can include the silicate coating, the silicate coating can include silicate, and at least a portion of the silicate can be covalently bonded to the polymeric substrate. The material can include the silicate coating, and the silicate coating can be applied to the polymeric substrate in a flame-pyrolytic deposition process. The chemical process can be or include a carbon capture process. The gas phase can include air and the chemical process can be or include a direct air capture process. The liquid phase can include an alkali metal hydroxide, the gas phase can include carbon dioxide, and the alkali metal hydroxide can be converted to an alkali metal carbonate upon exposure to the carbon dioxide.

In another aspect, the subject matter of this disclosure relates to an apparatus. The apparatus includes: a material including a polymeric substrate and at least one of: a silicate coating disposed over the polymeric substrate; or a polar mineral additive dispersed within the polymeric substrate at a loading from about 1% to about 25%, by weight; a liquid feed for forming a liquid film on the material; and a gas feed for exposing the liquid film to a gas.

In some implementations, the polymeric substrate can include a polymeric film including polyvinyl chloride, polyethylene, polypropylene, polyester, a co-polyester, polystyrene, polyamide, polyurethane, a biopolymer, a cellulose ester, or any combination thereof. The material can include the polar mineral additive, and the polar mineral additive can be or include a zeolite. The material can include the silicate coating, and the silicate coating can include silicon dioxide. The material can include the silicate coating, the silicate coating can include silicate, and at least a portion of the silicate can be covalently bonded to the polymeric substrate. The material can include the silicate coating, and the silicate coating can be applied to the polymeric substrate in a flame-pyrolytic deposition process. The liquid film can include an alkali metal hydroxide and/or an alkali metal carbonate, and the gas can be or include carbon dioxide or air. The material can be arranged in multiple stacked sheets to form a high surface area fill (e.g., for a cooling tower or gas-liquid contactor).

In another aspect, the subject matter of this disclosure relates to an apparatus. The apparatus includes: a plurality of stacked sheets including a polymeric substrate and at least one of: a silicate coating disposed over the polymeric substrate; or a polar mineral additive dispersed within the polymeric substrate at a loading from about 1% to about 25%, by weight.

In certain examples, the polymeric substrate can include a single layer, multiple layers, a woven fabric, and/or a nonwoven fabric. The plurality of stacked sheets can include a high surface area fill configured for use in a gas-liquid contactor.

In another aspect, the subject matter of this disclosure relates to a method of manufacturing a wettable material. The method includes: obtaining a plurality of sheets including a polymeric substrate and at least one of: a silicate coating disposed over the polymeric substrate; or a polar mineral additive dispersed within the polymeric substrate at a loading from about 1% to about 25%, by weight; and arranging the plurality of sheets in a stacked configuration.

In various instances, the polymeric substrate can include a single layer, multiple layers, a woven fabric, and/or a nonwoven fabric. The plurality of sheets can include the silicate coating, and the silicate coating can be formed by flame-pyrolytic deposition. The plurality of sheets can include the polar mineral additive. The stacked configuration can include a high surface area fill configured for use in a gas-liquid contactor. The plurality of sheets can include a surface layer having a passivating compound configured to stabilize the polymeric substrate and/or the silicate coating.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, compositions, systems, methods, and processes of the claimed invention encompass variations and adaptations developed using information from the embodiments described herein. Adaptation and/or modification of the apparatus, compositions, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, a "coating" as used herein can be or include a material disposed on a surface of a substrate. The coating can be continuous (e.g., a film) or can have discontinuities (e.g., voids or openings) and/or can be non-contiguous. In some examples, the coating can be or include particles of a mineral (e.g., a silicate) or other material bonded (e.g., covalently) to the surface of the substrate. The particles may or may not form a continuous film, such that portions of the substrate surface may not be covered by the particles or may be exposed. The coating may or may not have a uniform thickness.

Figure 1:
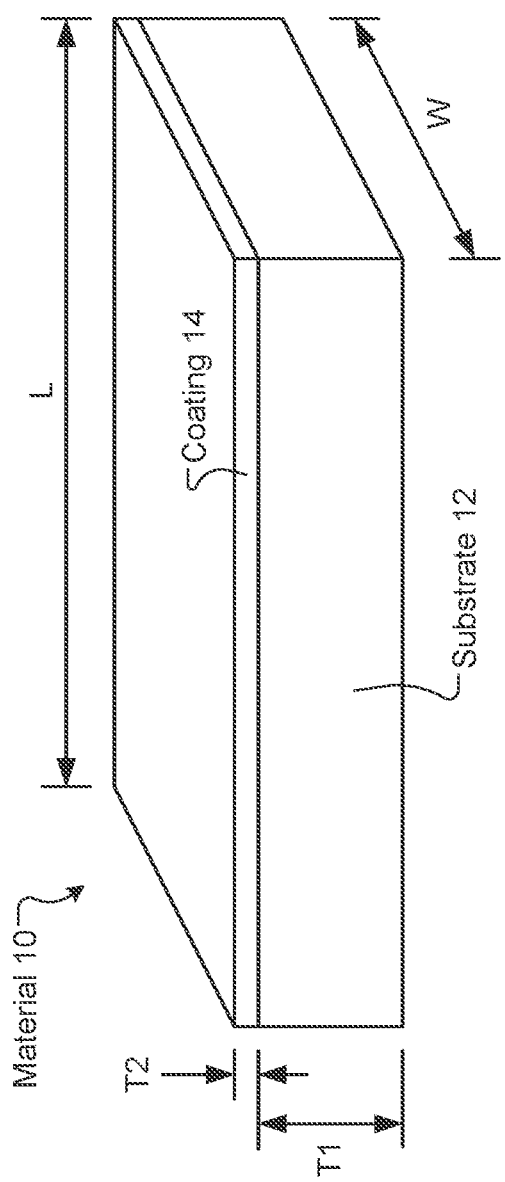
FIG. 1 is schematic diagram of a coating on a substrate, in accordance with certain embodiments.

FIG. 1 is a schematic diagram of a material 10 that includes a substrate 12 and a coating 14. The substrate 12 can be in the form of a thin sheet or film that can have any suitable thickness T1, width W, or length L. For example, the thickness T1 can be from about 10 microns to about 5 mm. The width W of the substrate 12 can be, for example, from about 0.1 m to about 2 m, or about 1 m. The length L of the substrate 12 can be, for example, from about 0.1 m to about 2 m, or about 1 m. In general, the substrate 12 can have any size and/or shape, which can be modified, if desired, before or after the coating 14 is applied to the substrate 12. The substrate 12 can be or include any material such as, for example, a polymeric material, a metal, a glass, a ceramic, a mineral, a cellulosic material, or any combination thereof. The polymeric material can be formed of or include, for example, a polyvinyl chloride (PVC), a polyethylene (e.g., low-density polyethylene or high-density polyethylene), a polypropylene, a polyester or co-polyester (e.g., polyethylene terephthalate (PET), PET-G, polyethylene naphthalate (PEN), polybutylene terephthalate (PBT), and/or polyethylene furanoate (PEF)), a polystyrene, a polyamide (e.g., nylon), a polyurethane, a biopolymer (e.g., polyhydroxyalkanoate (PHA)), a cellulose ester, or any combination thereof. The polymeric material can be or include a stand-alone polymer system (e.g., a polymer film having one or more layers) or an extruded or processed fiber system (e.g., a woven or nonwoven fabric made from polymer fibers). In various examples, the substrate 12 is a polymeric film, such as a calendered or extruded plastic film. The substrate 12 can have a matte surface, a gloss surface, a woven surface, a randomized surface structure, or other surface characteristic or texture. While FIG. 1 shows the coating 14 on only one side of the substrate 12, it is understood that both sides of the substrate 12 can be coated. Additionally or alternatively, while FIG. 1 shows the substrate 12 as being planar, it is understood that the substrate 12 can have a curved surface, a non-linear surface, a geometric surface, a porous or non-porous surface, a woven or non-woven surface, a mixture of convex and concave regions, or any combination thereof.

The coating 14 can be formed of or include, for example, a silicate or other mineral or salt. For example, the coating 14 can be or include tetramethyl silane. A thickness T2 of the coating 14 (e.g., an average thickness) can be, for example, from a trace amount (e.g., about 10 nm or less) to about 100 nm, from about 20 nm to about 60 nm, or about 40 nm. Any suitable coating thickness can be used. The thickness T2 of the coating 14 can be substantially uniform or nonuniform. In some examples, the coating 14 can be or include discrete particles of silicate or other mineral or salt bonded to the substrate 12. The material 10 or the coating 14 can have a surface energy greater than or equal to about 40 dyne/cm, greater than or equal to about 50 dyne/cm, greater than or equal to about 60 dyne/cm, or greater than or equal to about 70 dyne/cm. In some instances, the surface energy of the material 10 or the coating 14 can vary depending on a composition of the substrate 12. When a droplet of water (e.g., distilled water) is placed on the coating 14, a contact angle formed between an edge of the droplet and a surface of the coating 14 can be from about 20 degrees to about 70 degrees, from about 30 degrees to about 60 degrees, or from about 40 degrees to about 50 degrees. By comparison, a contact angle for a droplet of water on the substrate 12 itself (e.g., with no coating 14 or polar mineral additives) can be from about 70 degrees to about 90 degrees, or from about 78 degrees to about 82 degrees. The substrate 12 itself (e.g., with no coating 14 or polar mineral additives) can have a surface energy from about 25 dyne/cm to about 50 dyne/cm, or from about 34 dyne/cm to about 40 dyne/cm. Accordingly, applying the coating 14 to the substrate 12 can result in a surface that has a higher surface energy and/or achieves lower contact angles, such that the coated surface can be more wettable (e.g., by water or aqueous solutions) than the uncoated surface.

While the coating 14 is depicted in FIG. 1 as being a continuous layer, it is understood that the coating 14 can have openings, voids, or other discontinuities, and/or may not be contiguous. For example, one or more regions of the substrate 12 may include the coating and one or more other regions of the substrate 12 may be uncoated. The coated and/or uncoated regions of the substrate 12 may have any desired arrangement and/or may be in the form of, for example, discrete dots, rectangles, lines, or other areas that include the coating 14 or do not include the coating 14.

Experimental results indicate that the improved wettability characteristics of the coating 14 can be permanent. In one test involving a tetramethyl silane coating on PVC, contact angle measurements for droplets of water on the coating remained substantially constant or decreased (e.g., indicating improved wettability) over a period of one year. This was true for samples that were submerged in water or, to a greater extent (e.g., greater contact angle reduction), potassium hydroxide solutions when measurements were not being taken (e.g., the samples were removed from the solutions only during measurements). In one test, contact angles for the coatings described herein (e.g., silicate coatings) improved over time with exposure to potassium hydroxide. Accordingly, the coatings described herein (e.g., silicate coatings) can be permanent and/or can permanently enhance wettability. For example, the coatings described herein can last longer than 1 year, longer than 5 years, or longer than 10 years, when used in the chemical processes described herein. By comparison, the improved wettability benefits of previous surface modification techniques, such as corona treatments or flame treatments, are generally understood to be temporary and only guaranteed at time of manufacture.

In various examples, the coating 14 can be applied to the substrate 12 through high enthalpy processes, mechanical processes, and/or additive processes. Examples include using a deposition process such as flame-pyrolytic deposition or a plasma treatment process. Flame-pyrolytic deposition (a high enthalpy process) can involve exposing the substrate 12 (e.g., a plastic film) to a hydrocarbon-fueled flame doped with a small amount of tetramethyl silane or other polar mineral precursor, which can burn in the flame and/or be deposited as a silicate (e.g., silicon dioxide), a metal alkoxide, or polar mineral coating on the substrate 12. The coating 14 can be invisible, flexible, hydrophilic, and/or nano-porous (e.g., with nanometer-sized pores). The silicate or other polar mineral in the coating 14 can be covalently bonded to the substrate 12. A suitable flame-pyrolytic deposition process is the PYROSIL process provided by SURA Instruments GmbH, located in Jena, Germany (www.sura-instruments.de/en/technologies/pyrosilr-process). Alternatively or additionally, the coating 14 can be or include a plasma coating (e.g., a hydrophilic plasma coating and/or a nano-scale polymer layer) formed using a plasma surface treatment. In some examples, the coating 14 can be formed using mechanical coating or other deposition processes, such as, for example, vapor deposition, gravure coating, dip coating, blade coating, curtain coating, spray coating, or roll coating. Corona treatments can be performed to increase the surface energy or wettability of the coating 14 and/or the substrate 12.

In various examples, in addition to or instead of including the coating 14, the substrate 12 can include one or more zeolites, silicates, and/or other polar minerals or additives that improve wettability and/or increase a surface energy of the substrate 12. Such additives can be dispersed on or within the substrate 12 during an additive process (e.g., an extrusion process or a mixing process). While zeolites can be added to polymers (e.g., PVC) as co-stabilizers, the level (e.g., total mass) at which zeolites can be used in the substrate 12 (e.g., a polymeric substrate) for the purpose of elevating surface energy can be up to 10 times greater than the level at which zeolites may be used for co-stabilization. In some examples, one or more zeolites or other polar minerals can be added to the substrate 12 at a loading from about 1% to about 25%, from about 2% to about 20%, or from about 2% to about 12%, by weight (e.g., based on a total weight of the substrate). In certain implementations, the loading can be from 1% to 5% to 10% to 15% to 20% to 25%, by weight. The polar mineral additive can have minimum, maximum, or average particle sizes ranging from about 0.002 mm to about 2 mm. In some examples, the minimum, maximum, or average particle sizes can be less than or equal to about 4 microns or up to about 15 microns. Advantageously, the polar mineral additive can substantially improve wettability of the material 10, particularly when used in combination with the coating 14. For example, the polar mineral additive can improve wettability by providing surface texture (e.g., increased surface roughness) and/or by altering surface chemistry (e.g., by being at least partially exposed on the surface). The polar mineral additive can be dispersed evenly within the substrate 12 or can have a higher concentration near a surface of the substrate 12. The material 10, the substrate 12, and/or the coating 14 can have an arithmetic average surface roughness (Ra) greater than about 1 micron, or from about 1 micron to about 10 microns to about 50 microns to about 100 microns to about 500 microns, or greater.

The coating process (or the process used to add the polar mineral additive) can be followed by one or more post-processing steps that stabilize the coating 14 and/or the substrate 12 until installation or use. The post-processing can involve applying a solvent (e.g., water) mixed with a passivating compound, such as, for example, potassium hydroxide, potassium bicarbonate, sodium hydroxide, sodium bicarbonate, or other compound compatible with an end-user process. The solvent can be present in the mixture in an amount from about 25% to about 99.5%, by weight. The mixture can be applied to the coating 14 and/or the substrate 12 (e.g., as a surface layer or film) using, for example, vapor deposition, gravure coating, dip coating, blade coating, curtain coating, spray coating, or roll coating. A drying step can be performed to remove all residual moisture or solvent from the substrate surface. A masking step can be performed in which a mask, film, or other temporary protective layer is applied to the coating 14 and/or the substrate 12.

Figure 2:
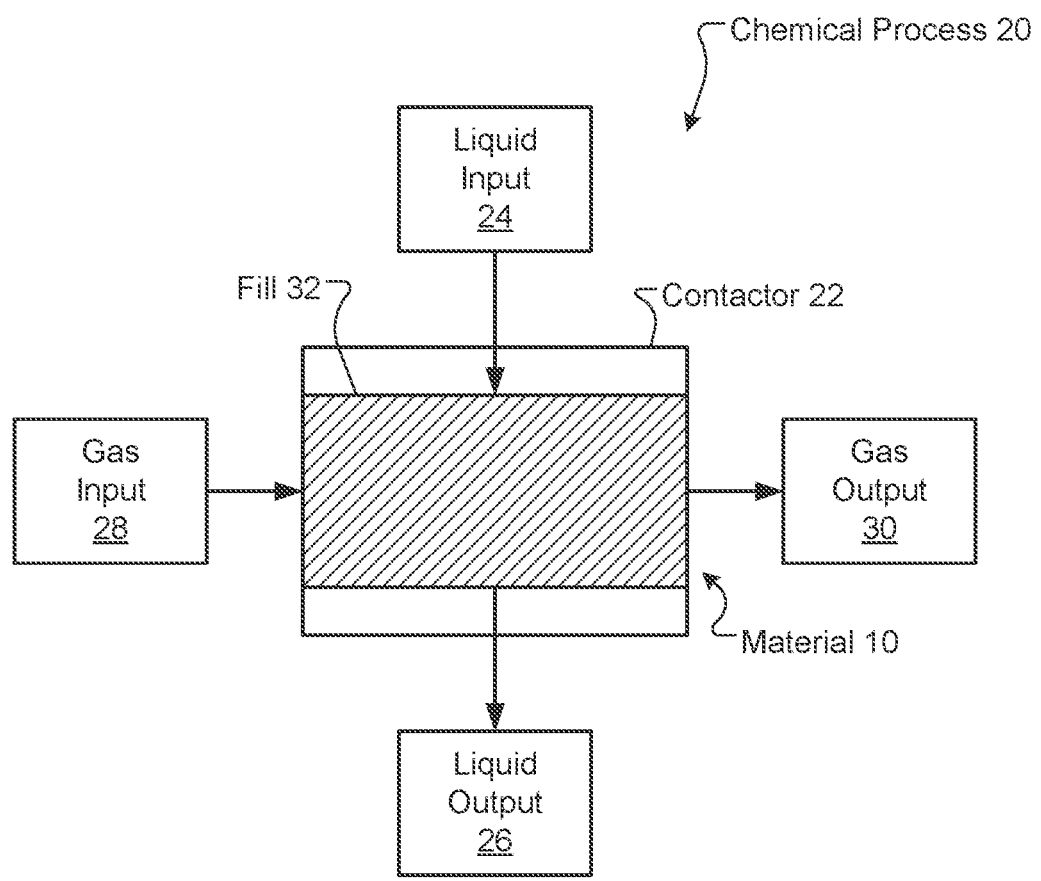
FIG. 2 is a schematic diagram of a chemical process involving a gas phase and/or a liquid phase, in accordance with certain embodiments.

Referring to FIG. 2, in various examples, the material 10 can be used in a chemical process 20 in which a gas-liquid contactor 22 (or other device) is used to bring a liquid phase into contact with a gas phase. The liquid phase can be or include, for example, water or an aqueous solution (e.g., including potassium hydroxide or sodium hydroxide). The liquid phase can be provided to the contactor 22 by a liquid input 24 and can be removed from the contactor 22 by a liquid output 26. The gas phase can be or include, for example, air or carbon dioxide. The gas phase can be provided to the contactor 22 by a gas input 28 and can be removed from the contactor 22 by a gas output 30.

The contactor 22 can include a high surface area fill 32 that includes the material 10. For example, the fill 32 can include multiple sheets (or pieces) of the material 10 that are stacked (or packed) in close proximity to one another (e.g., to achieve a minimum, maximum, or average separation distance of about 50 mm, about 25 mm, about 10 mm, or less). The sheets of the material 10 can be thermoformed, molded, extruded, blown, foamed, or deformed into a variety of geometric shapes, which can include, for example, corrugations, flutes, bends, curved surfaces, convex regions, concave regions, and/or channels. A variety of shapes and configurations are possible for the material 10 in the fill 32. When multiple sheets of the material 10 are stacked together or arranged in close proximity (e.g., in a parallel arrangement), the sheets (or corrugations thereof) can define passageways or channels through which the gas and liquid phases can flow. In some examples, the fill 32 can be configured for use in (or the gas-liquid contactor 22 can be or include) a cooling tower, such as a cross-flow cooling tower or a counter-flow cooling tower. In some instances, the fill 32 and/or the contactor 22 can include one or more discrete sheets, pieces, or particles of the material 10, in any shape or configuration. The fill 32 can be or include a splash fill or a film fill.

In various examples, the fill 32 can provide a large surface area for bringing the liquid phase and the gas phase into contact with one another. For example, due to the multiple sheets and high wettability of the material 10, the liquid phase can form continuous films on the material 10, such that a large surface area is formed between the gas and liquid phases in the fill 32. As the gas and liquid phases flow through the contactor 22, one or more chemical components or constituents can be transferred between the two phases. In some instances, for example, carbon dioxide can be transferred from the gas phase to the liquid phase. This can result in the liquid output 26 having a higher concentration of carbon dioxide, compared to the liquid input 24. Alternatively or additionally, the carbon dioxide can react with one or more components in the liquid phase (e.g., to convert an alkali metal hydroxide to an alkali metal carbonate). In certain examples, a flow of the liquid phase and/or the gas phase in the contactor 22 can be or include partial flow, flooded flow, contact flow, or bubble flow. The flow can be laminar or turbulent. The liquid phase can flow through the fill 32 in a downward direction, and the gas phase can flow in an upward direction (e.g., counter-flow) or in a horizontal direction (e.g., cross-flow).

In general, the chemical process 20 can be or include any process that involves contact between the liquid phase and the gas phase. In some instances, for example, the chemical process 20 can be or include a carbon capture process in which the gas phase is air and carbon dioxide is captured or removed from the air (alternatively referred to as direct air capture or carbon dioxide capture). The carbon capture process can involve wetting a plastic surface with an aqueous solution of alkali metal hydroxide (e.g., potassium hydroxide or sodium hydroxide) and converting at least a portion of the alkali metal hydroxide to an alkali metal carbonate in the presence of ambient carbon dioxide. Examples of suitable carbon capture processes are described in U.S. Pat. No. 8,119,091, issued Feb. 21, 2012, U.S. Pat. No. 8,871,008, issued Oct. 28, 2014, and U.S. Pat. No. 9,095,813, issued Aug. 4, 2015, the entire contents of each of which are incorporated by reference.

Figure 3:
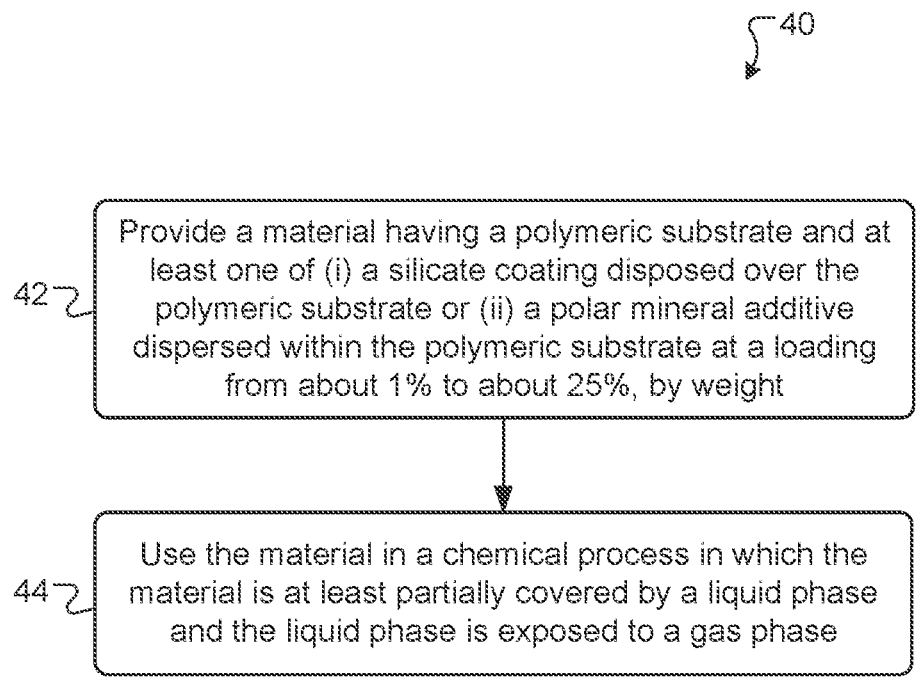
FIG. 3 is a flow chart of a method of using a material having improved wettability in a chemical process, in accordance with certain embodiments.

FIG. 3 is a flowchart of a method 40 of using a wettable material in a chemical process. A material (e.g., the material 10) is provided (step 42) that includes a polymeric substrate and at least one of: (i) a silicate coating disposed over the polymeric substrate; or (ii) a polar mineral additive dispersed on or within the polymeric substrate at a loading from about 1% to about 25%, by weight. The material is used (step 44) in a chemical process (e.g., the chemical process 20) in which the material is at least partially covered by a liquid phase and the liquid phase is exposed to or contacted by a gas phase.

Figure 4:
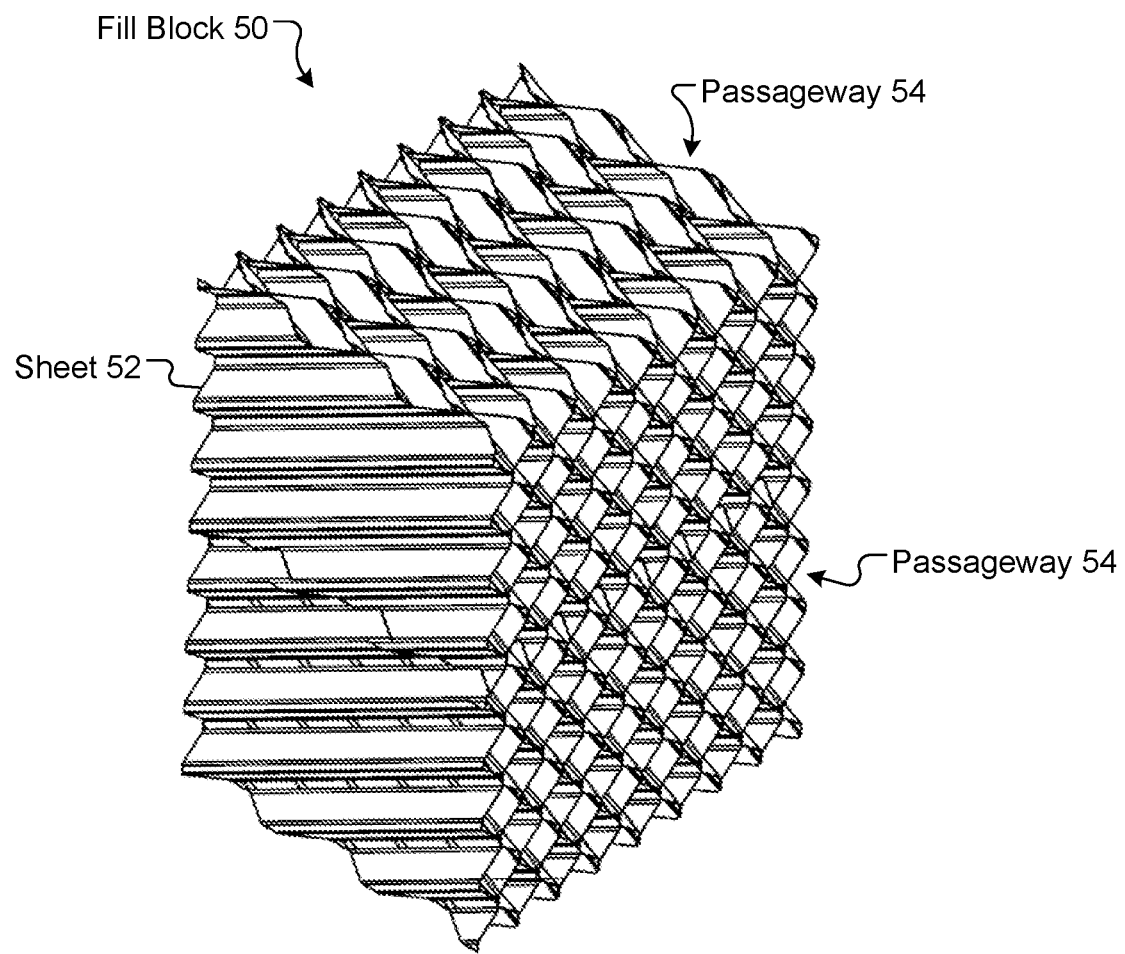
FIG. 4 is a perspective view of a fill block for a high surface area fill, in accordance with certain embodiments.

FIG. 4 is a perspective view of a fill block 50 for use as a high surface area fill (e.g., the fill 32) in a chemical process (e.g., the chemical process 20), in accordance with certain embodiments. In some examples, the fill block 50 includes a plurality of sheets 52 of a wettable material (e.g., the material 10). The sheets 52 can be stacked or positioned in proximity to one another and can include corrugations, flutes, bends, curved surfaces, convex regions, and/or concave regions that define channels or passageways 54 through which gas and liquid phases can flow.

Figure 5:
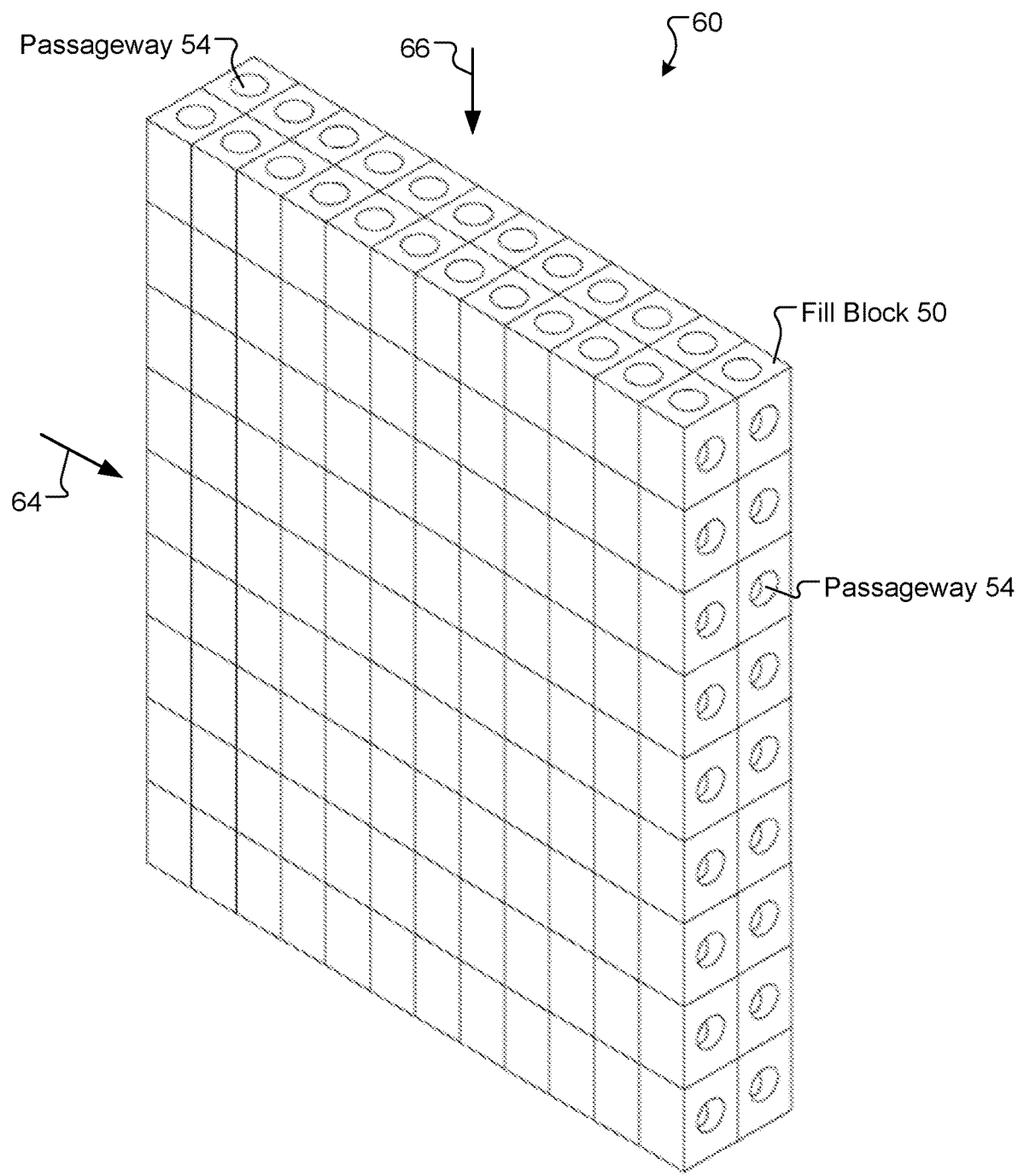
FIG. 5 is a perspective view of an arrangement of fill blocks, in accordance with certain embodiments.

FIG. 5 is a perspective view of an arrangement 60 of fill blocks 50 for use in the chemical process, in accordance with certain embodiments. In certain examples, passageways 54 within the fill blocks 50 (represented by circles for simplicity) can permit a cross-flow configuration for gas and liquid phases in the chemical process. For example, air can flow through the arrangement 60 in a horizontal direction 64 and liquid can flow through the arrangement 60 in a vertical direction 66. The blocks 50 can be held together in the arrangement 60 by friction, adhesive, and/or mechanical fasteners.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. For numerical ranges recited herein, various embodiments include any parameter value (e.g., integer or decimal value) within the cited ranges. For example, if a recited range is from 1 to 10, a value for the respective parameter can be greater than, less than, or equal to 1, 2, 3, . . . 9, or 10. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:
1. An apparatus comprising:
a plurality of stacked sheets comprising a polymeric substrate and a silicate coating disposed over the polymeric substrate, wherein the silicate coating comprises particles comprising silicate, and wherein at least a portion of the silicate is covalently bonded to the polymeric substrate.
2. The apparatus of claim 1, wherein the polymeric substrate comprises at least one of a single layer, multiple layers, a woven fabric, or a nonwoven fabric.
3. The apparatus of claim 1, wherein the plurality of stacked sheets is configured for use in a gas-liquid contactor.
4. The apparatus of claim 1, wherein the plurality of stacked sheets is disposed within a gas-liquid contactor comprising:
a liquid feed for forming a liquid film on the plurality of stacked sheets; and
a gas feed for exposing the liquid film to a gas.
5. The apparatus of claim 1, wherein the polymeric substrate comprises a polymeric film comprising at least one of polyvinyl chloride, polyethylene, polypropylene, polyester, a co-polyester, polystyrene, polyamide, polyurethane, a biopolymer, a cellulose ester, or any combination thereof.
6. The apparatus of claim 1, wherein the polymeric substrate comprises a polar mineral additive dispersed within the polymeric substrate at a loading from about 1% to about 25%, and the polar mineral additive comprises a zeolite.
7. The apparatus of claim 1, wherein the silicate coating comprises silicon dioxide.
8. The apparatus of claim 1, wherein the silicate coating was applied to the polymeric substrate in a flame-pyrolytic deposition process.
9. The apparatus of claim 4, wherein the apparatus comprises the liquid film, and wherein the liquid film comprises at least one of an alkali metal hydroxide or an alkali metal carbonate, and the gas comprises carbon dioxide.

10. The apparatus of claim 4, wherein the plurality of stacked sheets form a high surface area fill within the gas-liquid contactor.

11. The apparatus of claim 1, wherein the plurality of stacked sheets comprise a surface layer comprising a passivating compound configured to stabilize at least one of the polymeric substrate or the silicate coating.

12. The apparatus of claim 1, wherein the silicate coating comprises an arrangement of discrete particles bonded to the polymeric substrate.

13. The apparatus of claim 1, wherein the silicate coating comprises discontinuities between the particles where the polymeric substrate is exposed.

14. The apparatus of claim 4, wherein the gas-liquid contactor is configured to perform direct air capture or carbon dioxide capture.

15. The apparatus of claim 1, wherein the silicate coating comprises a more wettable surface and a higher surface energy, compared to the polymeric substrate.

16. The apparatus of claim 15, wherein the more wettable surface and the higher surface energy are permanent.

\* \* \* \* \*